UNITED STATES PATENT OFFICE.

JAMES McCAFFERTY, OF NEW YORK, N. Y.

IMPROVEMENT IN COMPOSITION PAINT-OILS.

Specification forming part of Letters Patent No. 137,854, dated April 15, 1873; application filed February 21, 1873.

*To all whom it may concern:*

Be it known that I, JAMES McCAFFERTY, of the city, county, and State of New York, have invented a new and useful Improvement in Composition Paint-Oil, of which the following is a specification:

My invention has for its object to furnish an improved paint-oil, simple in composition, readily prepared, and satisfactory in use, causing the paints to flow freely, and dry perfectly without scaling or cracking, which may take the place of linseed-oil for most purposes, and being much less expensive. The invention consists of the paint-oil formed of the ingredients in the proportions and manner hereinafter fully described.

In preparing my improved paint-oil I take one hundred and fifty pounds of good resin and melt and boil it in connection with four pounds of oxide of manganese for two hours, in any suitable vessel. Ten gallons of boiled linseed-oil are then poured in, and the boiling is continued for twenty minutes. The mixture is then taken out and poured into a tank or other suitable vessel containing twenty-two gallons of refined petroleum-oil, and one gallon of dissolved India rubber is poured in while the mixture is still warm. The mixture is then thoroughly stirred and allowed to stand for twenty-four hours to settle. The oil is then drawn off and is ready for use or market.

This paint-oil is superior to linseed-oil for priming or first coating, as it closes up the pores of the wood and prevents the absorption of whatever is applied to it, thereby saving both oil and other ingredients of the paint.

It can be advantageously used for grinding colored paints equally well with the best oil in market.

Having thus described my invention, I claim as new and desire to secure by Letters Patent—

A prepared paint-oil formed of resin, oxide of manganese, linseed-oil, refined petroleum-oil, and liquid rubber, applied together in the manner and proportions specified.

JAMES McCAFFERTY.

Witnesses:
JAMES T. GRAHAM,
T. B. MOSHER.